March 13, 1934.  O. SIMMEN  1,950,700
POWER TRANSMISSION COUPLING
Filed March 6, 1930  2 Sheets-Sheet 1

INVENTOR:
Oscar Simmen
BY
Pennie Davis Marvin + Edmonds
ATTORNEY.

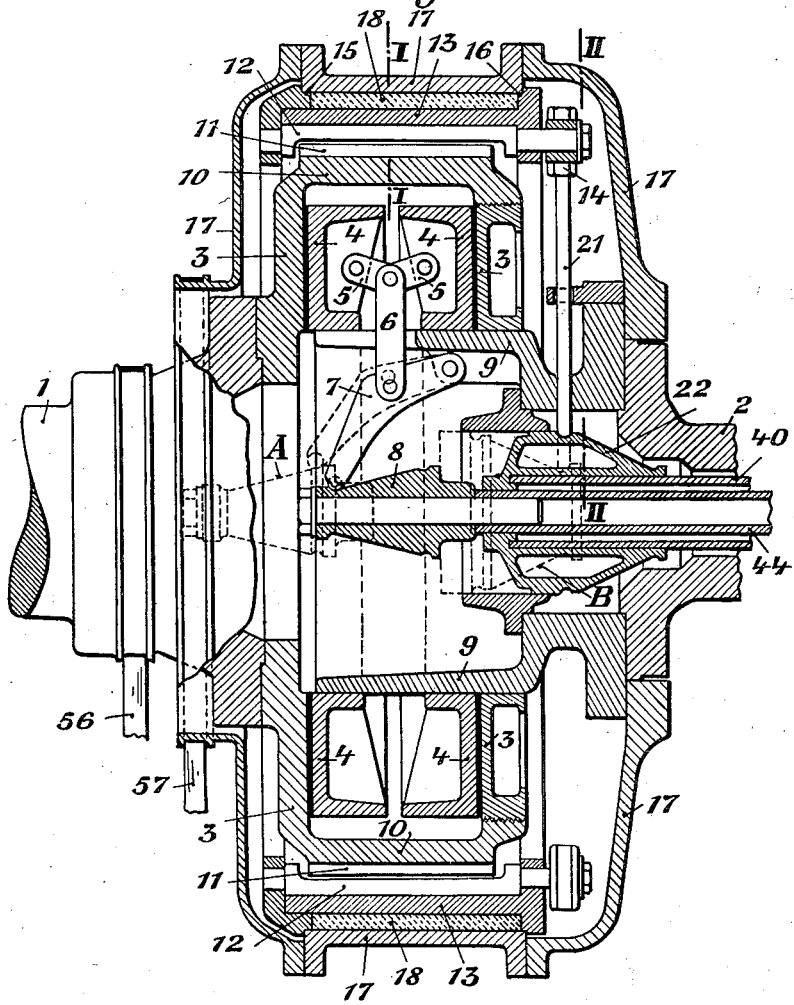

Patented Mar. 13, 1934

1,950,700

UNITED STATES PATENT OFFICE 1,950,700

POWER TRANSMISSION COUPLING

Oscar Simmen, Erlach, Switzerland, assignor to the firm Sulzer Freres Societe Anonyme, Winterthur, Switzerland Application March 6, 1930, Serial No. 433,650
In Switzerland March 7, 1929

4 Claims. (Cl. 192—53)

This invention relates to transmission couplings and has particular reference to those of the type comprising a slidable clutch for coupling a rotating shaft or like driving member to a member to be driven thereby, and means whereby the driving and driven members can be positively coupled when their speeds are substantially equal.

According to the present invention the positive coupling is constructed to close with a rapid or snap-like movement. One or more elastic members can be provided to take up stresses resulting from the positive engagement thus effected. The positive coupling means may be in the form of a clutch of the key or dog type and is conveniently provided with resilient buffers whereby any sudden shocks which may be imposed on the positive clutch during or after engagement and also torsional oscillations will be absorbed.

Figure 1:
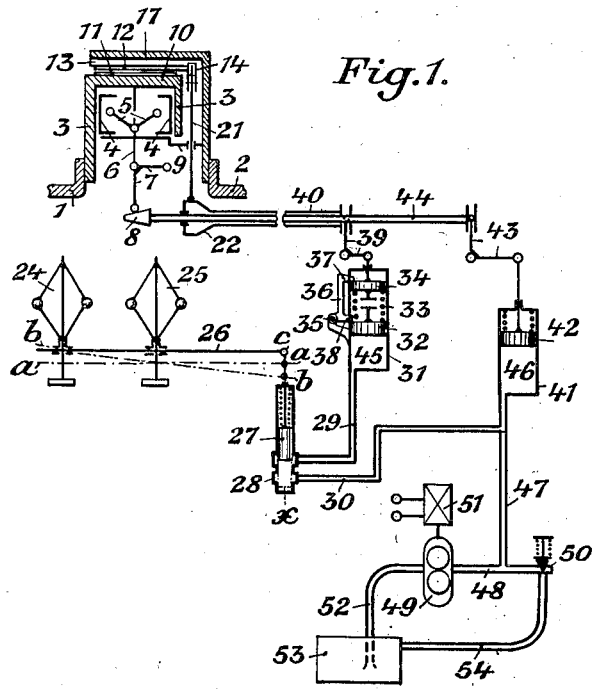
Figure 3:
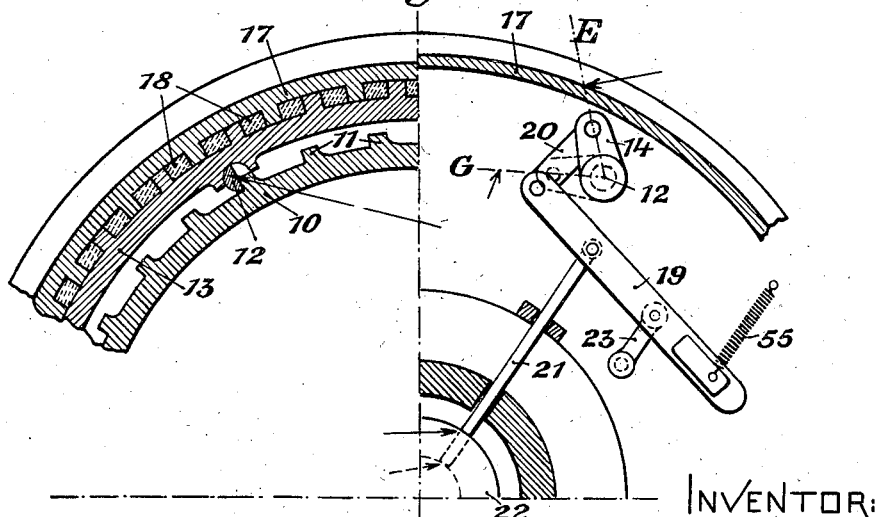

One construction of coupling according to this invention is illustrated by way of example in the accompanying drawings, in which Figure 1 shows in diagrammatic form the arrangement of the various parts of the coupling and operating means therefor, Figure 2 is a sectional side elevation of the coupling proper, and Figure 3 shows to the left a section on the line I—I of Figure 2 and to the right a similar view on the line II—II of Figure 2.

In Figures 1 and 2 the coupling is shown in the uncoupled state, 1 being the driving shaft and 2 the shaft to be driven thereby.

Secured to the driving shaft 1 is a friction drum 3 the interior of which provides friction surfaces for annular discs 4 which together with the friction drum 3 provide a slidable i. e. friction coupling. The discs 4 are so mounted on a supporting drum 9 secured to the driven shaft 2 that they are forced to rotate with the drum but can move in an axial direction relatively thereto. Links 5 and 6 connect the discs 4 to a bell crank lever 7 pivoted at one end on the drum 9 and bearing at the other end on a cam 8 which is adjustable in an axial direction. The discs 4 thus rotate with the driven shaft 2 and by axial movement of the cam 8 the discs can be moved into or out of engagement with the interior surfaces of the friction drum 3, thereby engaging or disengaging the friction coupling between the shafts 1 and 2.

The friction drum 3 has a circumferential portion 10 having on its outer surface teeth 11, and keys 12 are mounted so as to be rotatable in a bearer ring 13, each key being provided at one end with a crank 14 (Figure 3), whereby the key can be rotated into or out of engagement with the teeth 11 by means hereinafter fully described. The surfaces 15, 16 of the bearer ring 13 are in sliding engagement with a housing 17 secured to the driven shaft 2, buffers 18 of resilient material being provided between the ring 13 and the housing 17, as clearly shown in Figure 3. The buffers 18 serve to absorb any shocks which may be imposed on the coupling and also to reduce the effects of torsional oscillations.

Each of the cranks 14 through which the keys 12 are operated is connected by a link 20 to a lever 19 (Figure 3) pivoted on a link 23 and operated by a pusher bar 21. The provision of the link 23 ensures that the pusher bar 21 will at all times transmit accurate movements to the keys 12 in spite of relative movements which may take place between the keys 12 and the casing 17 due to the elasticity of the buffers 18. A spring 55 acts on one end of the lever 19 so as to counteract the effects of centrifugal force acting on the pusher bar 21 and lever 19. If desired a counterweight may be employed instead of or in addition to the spring 55. The inner end of the pusher bar 21 bears on the surface of a cam 22 which is axially adjustable, the arrangement being such that when the cam is moved axially in one direction or the other the keys 12 are engaged with or disengaged from the teeth 11, i. e. the positive coupling rendered operative or inoperative.

Coupled by means of a belt 56 (Figure 2) to the driving shaft 1 is a governor 24 (Figure 1) and a governor 25 is similarly coupled by means of a belt 57 to the housing 17 secured to the driven shaft 2. The sleeves of the governors 24, 25 both act on a horizontal rod 26 connected at one end to a piston valve 27 of a control device 28. Pressure medium (preferably oil) is supplied under pressure to the device 28 through a pipe 30 by means hereinafter described, and a pipe 29 connects the control device 28 to a pressure chamber 45 of a servo motor 31 whereby the positive clutch 11, 12 is to be operated. The servo motor 31 has a lower piston 32 which acts through a spring 33 on an upper piston 34, and a catch 36 pivoted at 35 is provided with lugs 37, 38 at its upper and lower ends respectively. The lug 37 normally engages the piston 34 and prevents the latter from moving upwards until the piston 32 has compressed the spring 33 and moved enough in the upward direction to engage the lug 38 and thereby tilt the catch 36 to release the piston 34. The piston 34 is connected to a bell crank lever 39 which engages a sleeve 40 carrying the cam 22 whereby the keys 12 are operated.

The pipe 30 is also in communication with a pressure chamber 46 of a second servo motor 41 whereby the friction coupling 3, 4 is to be operated. The servo motor 41 has a piston 42 connected through a bell crank lever 43 to a control rod 44 which carries the cam 8 for operating the friction clutch 3, 4. The fluid pressure medium is supplied to the pipe 30 through pipes 47 and 48 by a gear wheel pump 49 driven by an electric motor 51, the pump 49 drawing the fluid through a pipe 52 from a supply tank 53. A pressure release valve 50 is provided on the pipe 48 and has an overflow pipe 54 communicating with the tank 53.

When the two shafts 1 and 2 are at rest the sleeves of the governors 24, 25 will be in their lowermost position and the rod 26 will therefore be in the position a, a shown in chain lines in Figure 1. If now the shaft 1 is set in motion the sleeve of the governor 24 will be raised, but the shaft 2 being stationary the sleeve of the governor 25 will remain in its lowermost position so that the rod 26 will be in the tilted position b, b. The lower end of the valve 27 will now be in the position marked x in Figure 1 and therefore will shut off communication between the pipe 30 and the pipe 29, so that no fluid will be supplied to the servo motor 31 and the positive clutch 11, 12 will remain uncoupled.

If now it is desired to couple the stationary shaft 2 to the rotating shaft 1 the motor 51 is started whereupon the pump 49 supplies fluid under pressure to the pressure chamber 46 of the servo motor 41, the value of the pressure being determined by the setting of the release valve 50. The piston 42 will now rise under the pressure of the medium and the control rod 44 will move to the left until the cam 8 which it carries occupies the position A shown dotted in Figure 2. This movement of the cam 8 causes the bell crank lever 7 to tilt into the position shown dotted in Figure 2 and therefore to move the link 6 radially outwards thus forcing the discs 4 apart and into engagement with the inner surfaces of the friction drum 3.

The discs 4, drum 9 and shaft 2 will now commence to rotate the drive being taken up gradually and without shock until the shaft 2 finally attains the same speed as the driving shaft 1. It will be understood that the friction clutch alone is intended to provide a smooth coupling only and is not suitable for transmitting large torques. When it is desired to transmit large torques the positive coupling is rendered operative after the driven shaft has attained a speed equal to that of the driving shaft. As the speed of the shaft 2 increases the rod 26 will be raised by the governor 25 until the speeds of the two shafts are equal when the rod 26 will occupy the position b—c and the piston valve 27 raised to the position shown in full lines in Figure 1. At this point the piston valve 27 has uncovered the opening of the pipe 29 and pressure medium will be admitted to the pressure chamber 45 of the servo motor 31. The lower piston 32 will now rise under the action of the pressure medium in the chamber 45 and will compress the spring 33. Compression of the spring 33 will continue until the piston 32 causes disengagement of the lug 37 from the piston 34 whereupon the latter rises sharply under the action of the spring 33 and moves the sleeve 40 and cam 22 axially to the left. The cam 22 will thus move sharply into the position shown dotted at B in Figure 2 and the pusher bars 21 sliding down the face of the cam 22 move radially inwards under the influence of the springs 55. This movement of the pusher bars 21 results in the cranks 14 being moved by the levers 19, 20 through about a quarter of a revolution, namely from the position E (Figure 3) in which the keys 12 are inoperative into the position G in which the pawls engage the teeth 11. Thus the friction drum 10 secured to the driving shaft is positively coupled by the teeth 11 and keys 12 to the bearer ring 13 secured to the driven shaft 2.

As will be readily seen the positive clutch is arranged to close with a rapid or "snap-like" movement, the keys 12 being either out of engagement with the teeth 11 or fully engaged therewith. Such operation of the positive clutch has the advantage that the pawls and teeth are not liable to be damaged as in the case of couplings which are rendered operative in a relatively gradual manner.

The shafts 1 and 2 are now coupled in such a manner that the torque transmitted no longer depends on the frictional engagement between the drum 3 and the discs 4 but is positively transmitted for all loads, the buffers 18 absorbing any shocks or torsional oscillations which may be transmitted from one shaft to the other.

It will be seen that as the elastic buffers minimize any shocks which might otherwise be transmitted and also reduce the effects of oscillatory vibrations, all the advantages of a friction coupling, positive coupling and resilient coupling are combined in apparatus constructed in accordance with the present invention.

The power coupling above described is particularly suitable for use in conjunction with hydraulic accumulator apparatus, the coupling being arranged between the driving motor and the pump. In this case the pump from which the water has been drained can be first coupled by means of the friction clutch to the motor while this is rotating, the positive clutch being subsequently engaged when the pump has attained a speed equal to that of the motor. The air is now exhausted from the pump which fills with water and gradually takes up the load. Thus when a coupling according to this invention is so employed the pump, even where this has to deal with heavy loads, can be coupled to the motor while this is running without imposing excessive strain on the motor or on the transmission shafts.

I claim:

1. A power transmission apparatus comprising a driving shaft and a driven shaft, a clutch for positively connecting the driving shaft to the driven shaft, said clutch consisting of a key carried by one shaft and abutments carried by the other shaft, means for initially rotating the driven shaft and, a cam for moving the key into engagement with the abutments and means responsive to the speed of the driven shaft and the driving shaft for operating the cam.

2. A power transmission apparatus comprising a driving shaft and an aligned driven shaft, a clutch for frictionally connecting the shafts, a clutch for positively directly and rigidly connecting the driven shaft to the driving shaft, said clutch consisting of a sleeve carried by one of the shafts and receiving therein a stub of the other shaft, locking means mounted on the sleeve for effecting positive engagement with the stub, and resilient means interposed between the locking means and the sleeve for permitting yielding movement therebetween.

3. A power transmission apparatus comprising a driving shaft and a driven shaft, means for frictionally connecting the shafts, and additional means responsive to the speeds of both the driving and the driven shafts for independently directly and positively connecting the shafts.

4. A power transmission apparatus comprising a driving shaft and a driven shaft, a clutch for operatively connecting the shafts said clutch consisting of toggle operated expansible portions mounted on one shaft and adapted to frictionally engage the other shaft, a cam for operating the expansible portions, a piston for controlling the operation of the cam, a cylinder within which the piston is reciprocable, a governor responsive to the speed of the driving shaft, an additional clutch for independently locking the shafts together, said clutch consisting of a key on the driven shaft arranged to engage an abutment on the driving shaft, a cam for moving the key into and out of operative position, a piston for controlling the operation of the cam, a cylinder within which the piston is reciprocable, a governor responsive to the speed of the driven shaft for admitting fluid to the cylinder to operate the piston, and means normally preventing movement of the key into operative position, said means being operable by the governor and rendered ineffective when the speeds of the driving and driven shafts are substantially equal.

OSCAR SIMMEN.